US012586079B2

(12) United States Patent
Uratani et al.

(10) Patent No.: US 12,586,079 B2
(45) Date of Patent: Mar. 24, 2026

(54) REMOTE CUSTOMER SERVICE SYSTEM

(71) Applicant: SHARP KABUSHIKI KAISHA, Sakai (JP)

(72) Inventors: Osamu Uratani, Sakai (JP); Kazuo Nishiura, Sakai (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 94 days.

(21) Appl. No.: 18/398,602

(22) Filed: Dec. 28, 2023

(65) Prior Publication Data

US 2024/0242230 A1 Jul. 18, 2024

(30) Foreign Application Priority Data

Jan. 16, 2023 (JP) ................................. 2023-004330

(51) Int. Cl.
 G06Q 30/015 (2023.01)
 G06V 20/40 (2022.01)

(52) U.S. Cl.
 CPC ........... G06Q 30/015 (2023.01); G06V 20/44 (2022.01); *G06V 2201/07* (2022.01)

(58) Field of Classification Search
 CPC ..... G06Q 30/015–016; G06Q 30/0281; G06Q 30/0613–0619; G06V 20/44
 See application file for complete search history.

(56) References Cited

U.S. PATENT DOCUMENTS

| | | | |
|---|---|---|---|
| 11,763,366 B1* | 9/2023 | Derza | G06N 5/02 |
| | | | 705/26.41 |
| 2010/0036670 A1* | 2/2010 | Hill | H04W 4/029 |
| | | | 705/304 |
| 2021/0182922 A1* | 6/2021 | Zheng | H04N 23/69 |

FOREIGN PATENT DOCUMENTS

JP 2019-076269 A 5/2019

OTHER PUBLICATIONS

Zheng et al. (U.S. P.G. Pub. 2021/0182922 A1), and Grewal, D., Noble, S.M., Roggeveen, A.L. et al. The future of in-store technology. J. of the Acad. Mark. Sci. 48, 96-113 (2020). https://doi.org/10.1007/s11747-019-00697-z. (Year: 2020).*

* cited by examiner

*Primary Examiner* — Scott M Tungate
(74) *Attorney, Agent, or Firm* — ScienBiziP, P.C.

(57) ABSTRACT

In a remote customer service system, an operator who is at a remote place from a customer visiting a store serves the customer via a customer service terminal apparatus provided in the store. The remote customer service system includes the customer service terminal apparatus, an imaging apparatus imaging inside of the store, and a control apparatus. The control apparatus includes: an image recognizer that recognizes a subject included in a captured image by the imaging apparatus as a tracking target, and acquires information on the tracking target from the captured image; and a control information generator that generates control information for executing a notification that prompts the operator to start customer service on the basis of the information on the tracking target.

8 Claims, 13 Drawing Sheets

10

FIG. 1
10
Cc         300         St
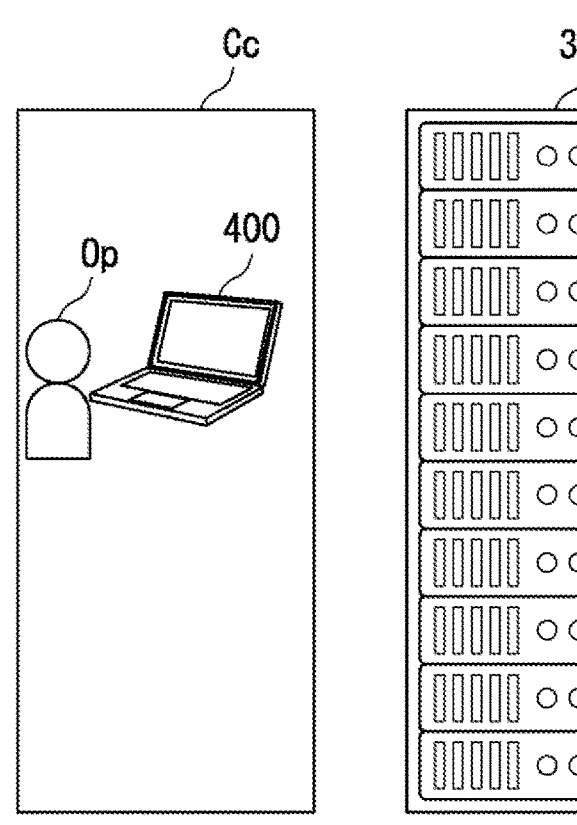
Op
400
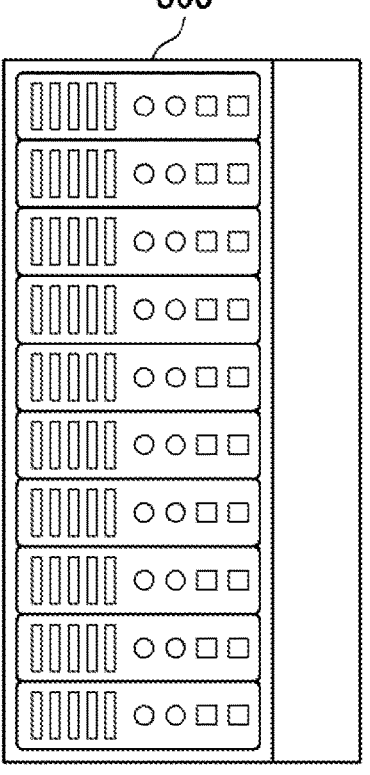
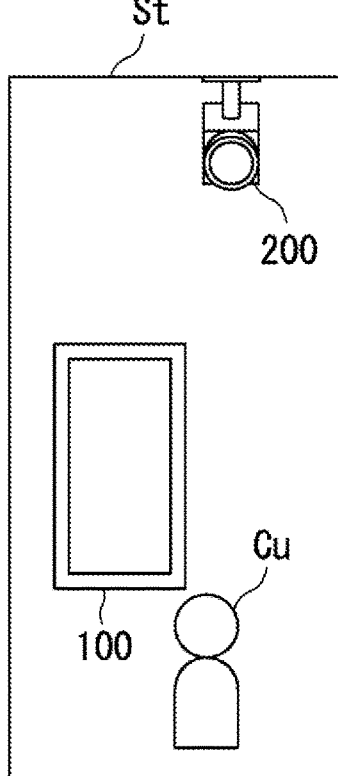
200
100
Cu

FIG. 3A
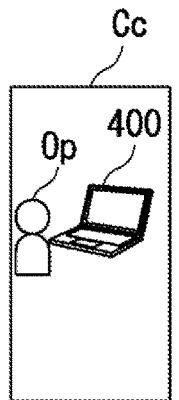
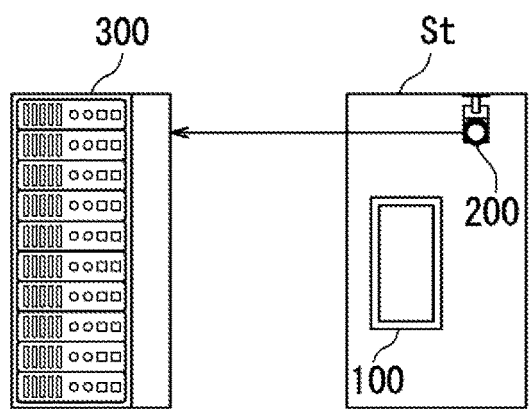
FIG. 3B
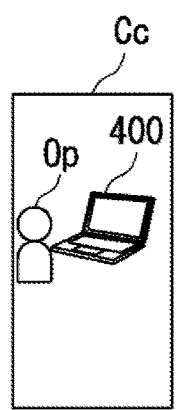
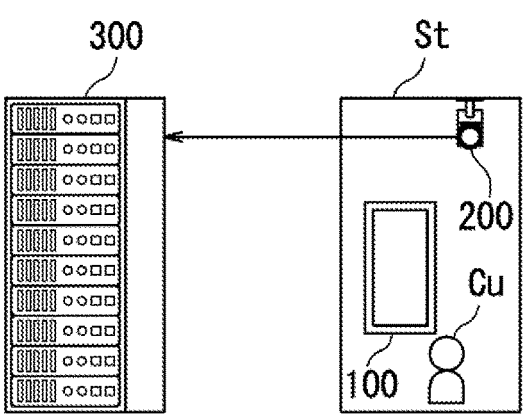
FIG. 3C
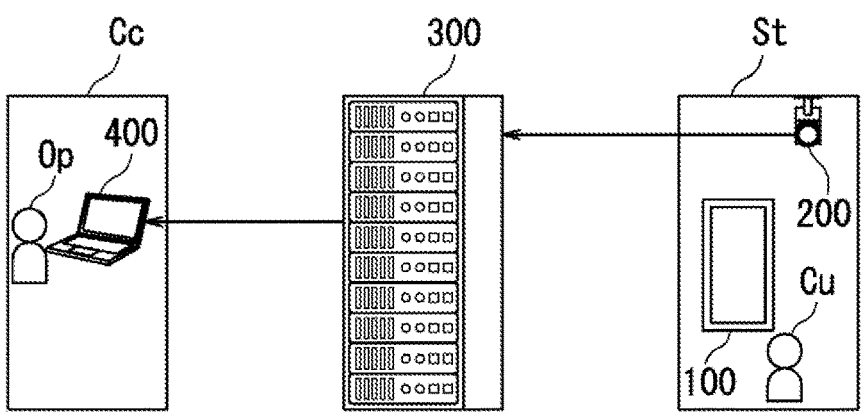

FIG. 5A
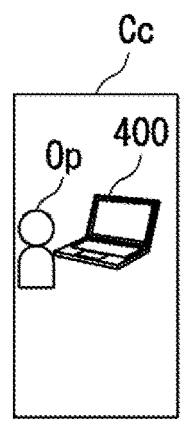
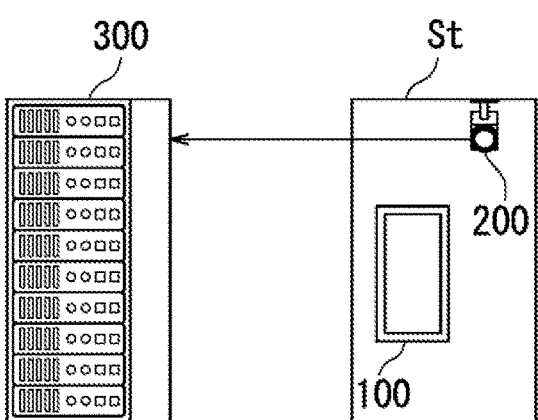
FIG. 5B
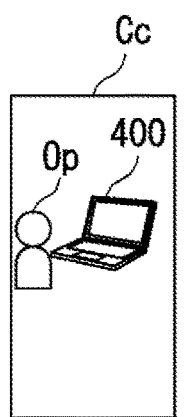
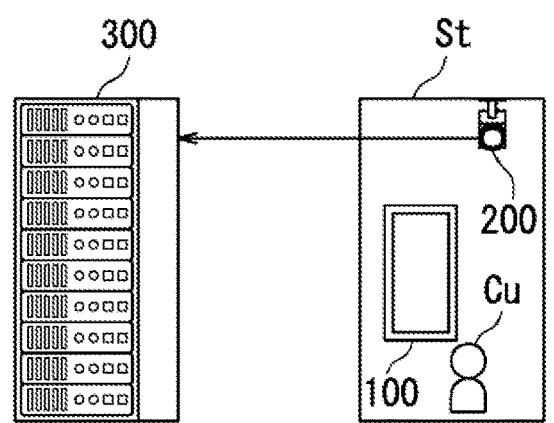
FIG. 5C
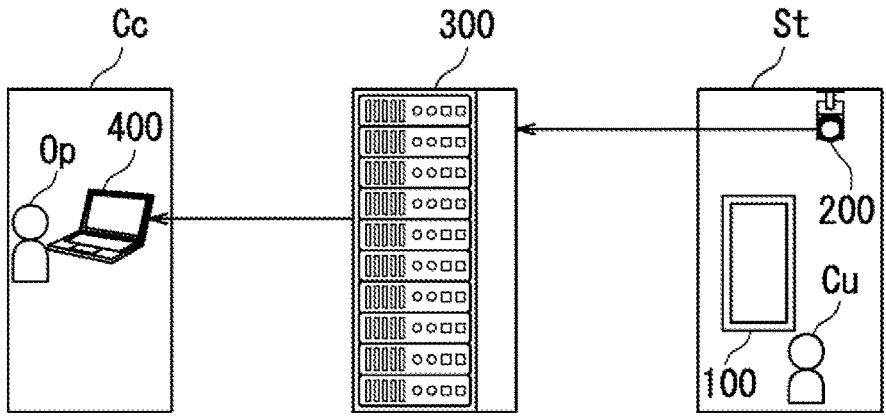

400

400

STAYING 5
MINUTES OR
LONGER

400

IT IS HIS/HER
THIRD VISIT.

PLEASE PRESS BUTTON IF YOU NEED HELP.

Figure 12:
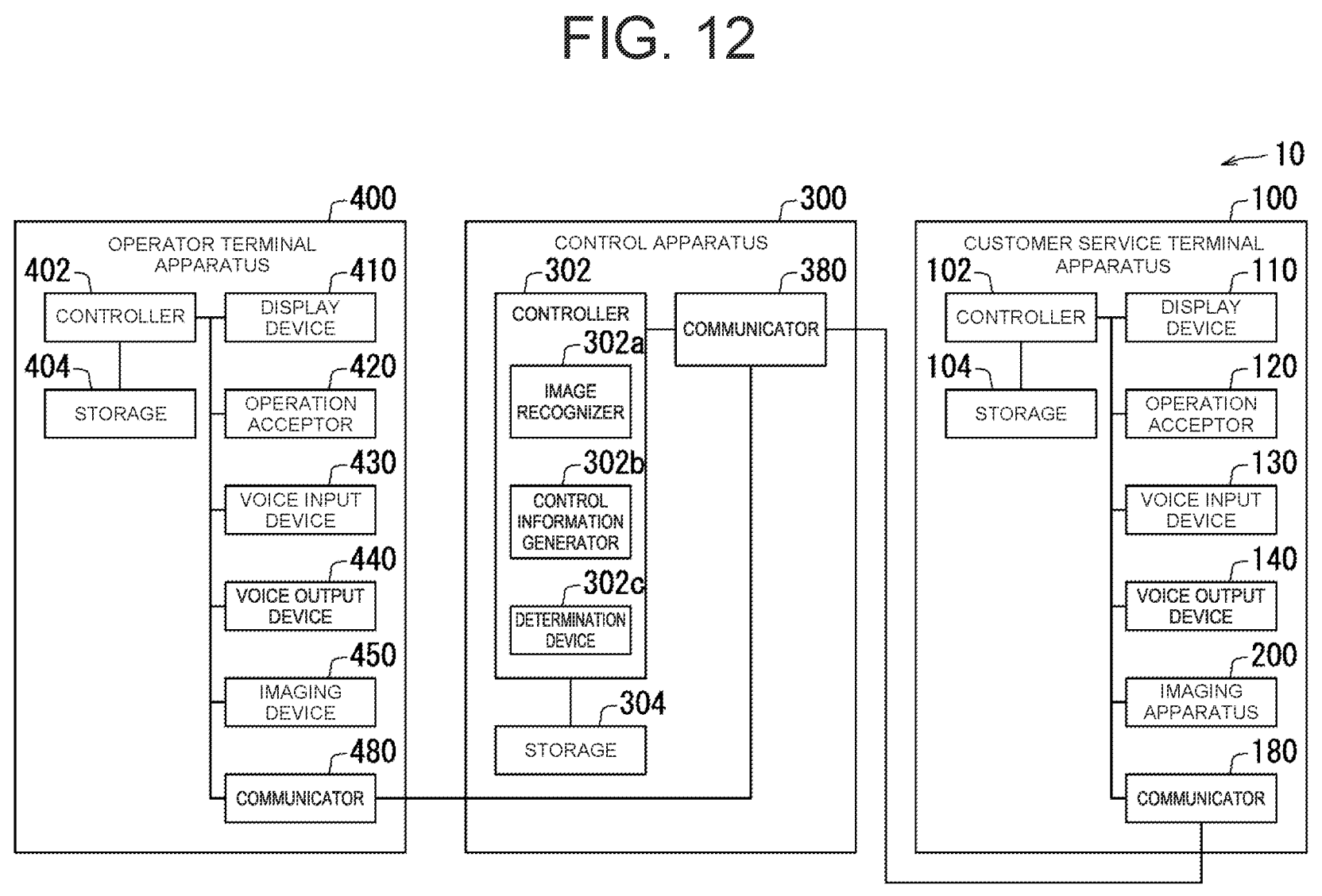

100 CUSTOMER SERVICE TERMINAL APPARATUS

110 DISPLAY DEVICE

120 OPERATION ACCEPTOR

130 VOICE INPUT DEVICE

140 VOICE OUTPUT DEVICE

200 IMAGING APPARATUS

180 COMMUNICATOR

102 CONTROLLER

104 STORAGE

300 CONTROL APPARATUS

380 COMMUNICATOR

302 CONTROLLER

302a IMAGE RECOGNIZER

302b CONTROL INFORMATION GENERATOR

302c DETERMINATION DEVICE

304 STORAGE

400 OPERATOR TERMINAL APPARATUS

410 DISPLAY DEVICE

420 OPERATION ACCEPTOR

430 VOICE INPUT DEVICE

440 VOICE OUTPUT DEVICE

450 IMAGING DEVICE

480 COMMUNICATOR

402 CONTROLLER

404 STORAGE

Figure 14:
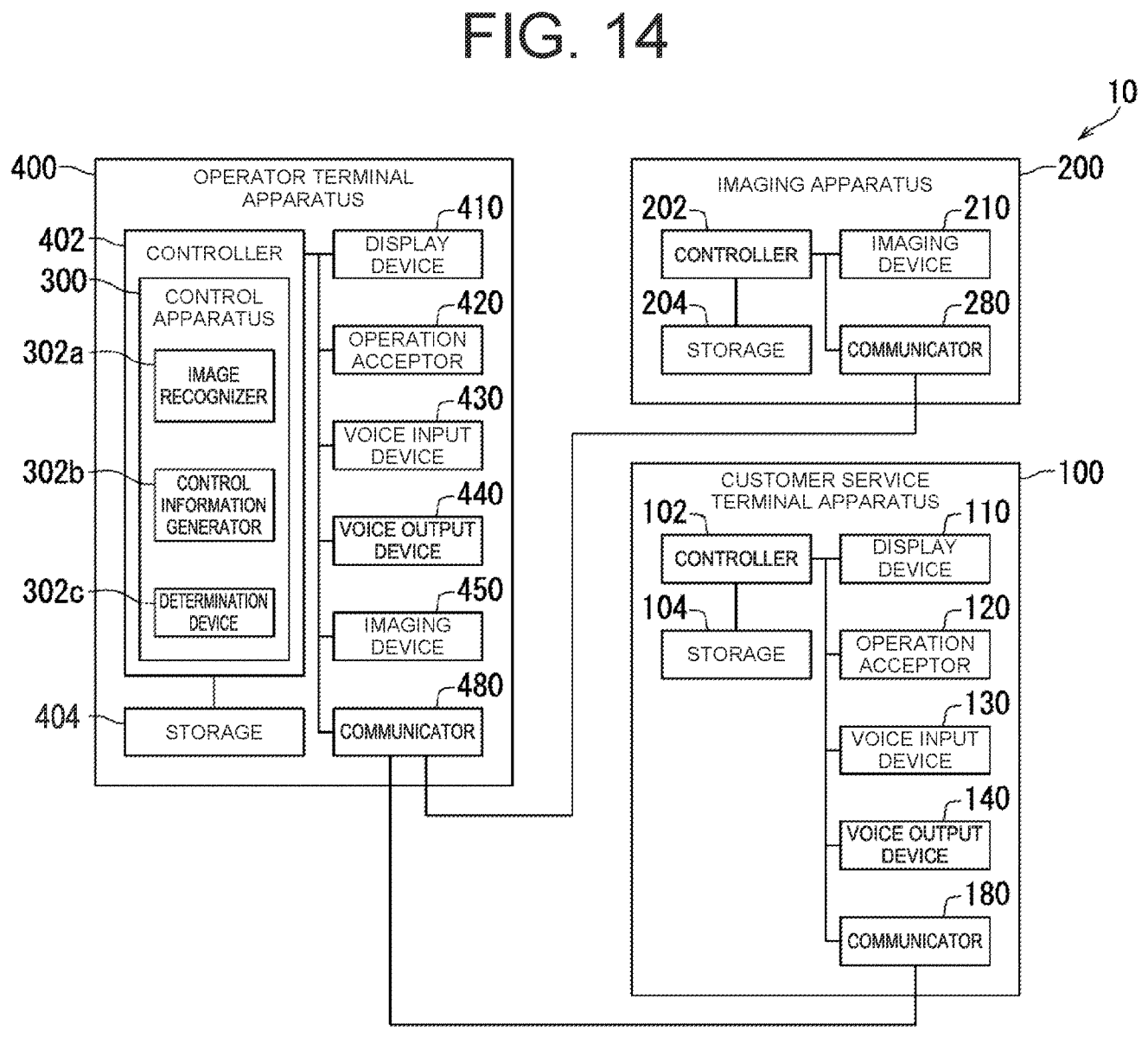

200 IMAGING APPARATUS

202 CONTROLLER
204 STORAGE
210 IMAGING DEVICE
280 COMMUNICATOR

100 CUSTOMER SERVICE TERMINAL APPARATUS

102 CONTROLLER
104 STORAGE
110 DISPLAY DEVICE
120 OPERATION ACCEPTOR
130 VOICE INPUT DEVICE
140 VOICE OUTPUT DEVICE
180 COMMUNICATOR

400 OPERATOR TERMINAL APPARATUS

402 CONTROLLER
300 CONTROL APPARATUS
302a IMAGE RECOGNIZER
302b CONTROL INFORMATION GENERATOR
302c DETERMINATION DEVICE
404 STORAGE
410 DISPLAY DEVICE
420 OPERATION ACCEPTOR
430 VOICE INPUT DEVICE
440 VOICE OUTPUT DEVICE
450 IMAGING DEVICE
480 COMMUNICATOR

REMOTE CUSTOMER SERVICE SYSTEM

INCORPORATION BY REFERENCE

This application claims the benefit of priority under U.S.C. 119 based on Japanese Patent Application No. 2023-004330 filed on Jan. 16, 2023, the entire contents of which are incorporated herein by reference.

BACKGROUND

The present disclosure relates to a remote customer service system.

In recent years, there are increasing cases where a remote operator serves a customer via a communication line such as the Internet or a dedicated line, and various techniques for smoothly proceeding with remote customer service have been proposed. For example, the following technique has been known in the related art. In the technique, by receiving a product and an area where the product is to be used from the customer's terminal, a serving salesperson is specified on the basis of the area where the product is to be used, and communication is made between the customer's terminal and the salesperson's terminal.

SUMMARY

In a remote customer service system according to the present disclosure, an operator at a remote place from a customer visiting a store serves the customer via a customer service terminal apparatus provided in the store. The remote customer service system includes the customer service terminal apparatus, an imaging apparatus imaging inside of the store, and a control apparatus. The control apparatus includes: an image recognizer that recognizes a subject included in a captured image by the imaging apparatus as a tracking target, and acquires information on the tracking target from the captured image; and a control information generator that generates control information for executing a notification that prompts the operator to start customer service on the basis of the information on the tracking target.

BRIEF DESCRIPTION OF THE DRAWINGS

FIG. 1 is a schematic view of a remote customer service system in the present embodiment.

FIG. 3A is a schematic view of the remote customer service system in the present embodiment.

FIG. 3B is a schematic view of the remote customer service system in the present embodiment.

FIG. 3C is a schematic view of the remote customer service system in the present embodiment.

FIG. 5A is a schematic view of the remote customer service system in the present embodiment.

FIG. 5B is a schematic view of the remote customer service system in the present embodiment.

FIG. 5C is a schematic view of the remote customer service system in the present embodiment.

FIG. 12 is a block diagram of the remote customer service system in the present embodiment.

FIG. 14 is a block diagram of the remote customer service system in the present embodiment.

DETAILED DESCRIPTION

Figure 2:
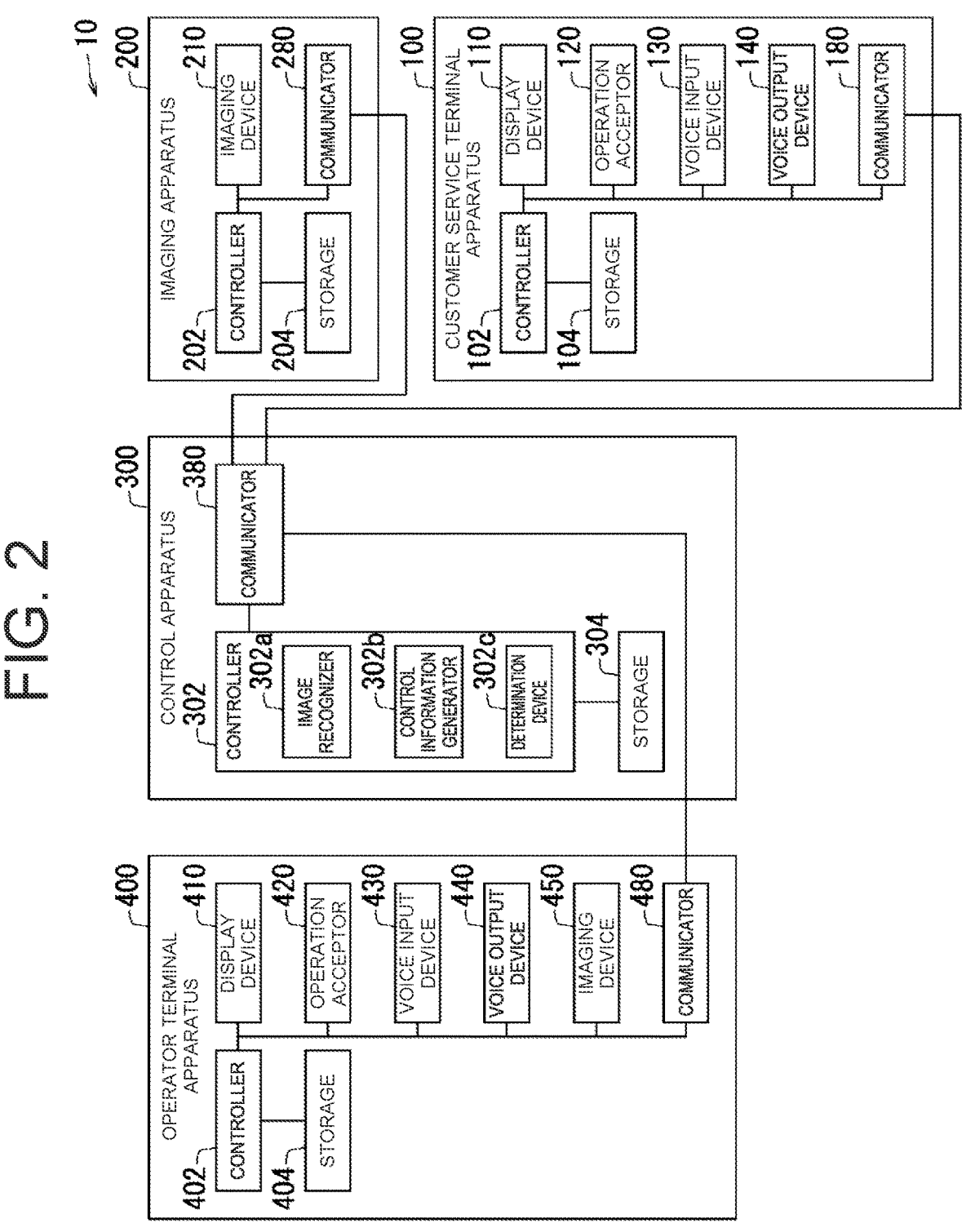
FIG. 2 is a block diagram of the remote customer service system in the present embodiment.

A description will hereinafter be made on a remote customer service system 10 according to an embodiment with reference to the drawings. In the drawings, the same or corresponding portions will be denoted by the same reference signs, and the description thereon will not be repeated.

First, a description will be made on the remote customer service system 10 in the present embodiment with reference to FIG. 1. FIG. 1 is a schematic view of a configuration of the remote customer service system 10 in the present embodiment.

As illustrated in FIG. 1, the remote customer service system 10 is a system that enables an operator Op who is in a remote place from a store St to serve a customer Cu in the store St. For example, the remote customer service system 10 allows exchange of voice, a video image, and/or a message between the customer Cu in the store St and the operator Op in a call center Cc located at a location away from the store St.

The remote customer service system 10 includes a customer service terminal apparatus 100, an imaging apparatus 200, and a control apparatus 300. The customer service terminal apparatus 100 is arranged in the store St. The customer service terminal apparatus 100 is used to serve the customer Cu.

For example, the customer service terminal apparatus 100 presents information on a product in the store St to the customer Cu. In addition, the customer service terminal apparatus 100 presents information on the store St itself to the customer Cu.

For example, the customer service terminal apparatus 100 outputs the voice to the customer Cu. The customer service terminal apparatus 100 may output the voice of the operator Op. Alternatively, the customer service terminal apparatus 100 may output predetermined voice that is stored in advance.

In addition, the customer service terminal apparatus 100 displays the video image to the customer Cu. The customer service terminal apparatus 100 may display the video image of the operator Op. Alternatively, the customer service terminal apparatus 100 may display a predetermined video image that is stored in advance.

In the present embodiment, the customer service terminal apparatus 100 may be a device such as a personal computer (PC), a tablet terminal, or a smartphone. The customer service terminal apparatus 100 may be digital signage.

The imaging apparatus 200 images inside of the store St. The imaging apparatus 200 is arranged in the store St.

The imaging apparatus 200 images the inside of the store St. The imaging apparatus 200 generates captured image information on the basis of the imaging. The imaging apparatus 200 images a predetermined area in the store St. When the customer Cu enters the predetermined area in the store St, the imaging apparatus 200 images the customer Cu in the store St.

Typically, the imaging apparatus 200 is installed near the customer service terminal apparatus 100. The imaging apparatus 200 may be operated in conjunction with the customer service terminal apparatus 100.

The control apparatus 300 is arranged at a different location from the store St and the call center Cc. The control apparatus 300 allocates the operator Op who is to serve the customer Cu in the store St. For example, the control apparatus 300 is a so-called server.

The control apparatus 300 is connected to the imaging apparatus 200. The imaging apparatus 200 and the control apparatus 300 are connected to a communication line such as a public line or a dedicated line.

The control apparatus 300 receives imaging information from the imaging apparatus 200. From the imaging apparatus 200, the control apparatus 300 receives the imaging information acquired by imaging vicinity of the customer service terminal apparatus 100.

The remote customer service system 10 further includes an operator terminal apparatus 400. The operator terminal apparatus 400 is arranged in the call center Cc. The operator terminal apparatus 400 is used by the operator Op. In the present embodiment, the operator terminal apparatus 400 may be a device such as a PC, a tablet terminal, or a smartphone.

The operator Op uses the operator terminal apparatus 400 to perform remote customer service by exchanging the video image and the voice with the customer Cu via the customer service terminal apparatus 100.

The control apparatus 300 is connected to the operator terminal apparatus 400. The control apparatus 300 and the operator terminal apparatus 400 are connected to the communication line such as the public line or the dedicated line.

The control apparatus 300 transmits, to the operator terminal apparatus 400, control information for executing a notification that prompts the operator Op to start the customer service. In addition, the control apparatus 300 receives, from the operator terminal apparatus 400, customer service start information that indicates the start of the customer service by the operator Op.

The control apparatus 300 may be connected to the customer service terminal apparatus 100. The customer service terminal apparatus 100 and the control apparatus 300 are connected to the communication line such as the public line or the dedicated line.

The control apparatus 300 connects the customer service terminal apparatus 100 and the operator terminal apparatus 400 on the basis of the customer service start information. Then, the control apparatus 300 transmits customer service information, including the image, the voice, and the message, from the operator terminal apparatus 400 to the customer service terminal apparatus 100. The control apparatus 300 transmits, to the operator terminal apparatus 400, the customer service information that includes the image, the voice, and the message from the customer service terminal apparatus 100 and/or the imaging apparatus 200.

According to the remote customer service system 10 in the present embodiment, the customer service to the customer Cu can be started when the customer Cu needs the service. The remote customer service system 10 enables the operator Op, who is in the remote place from the customer Cu visiting the store St, to serve the customer Cu in the store St.

The number of the customer service terminal apparatus 100 is not limited to one and may be two or more. Hereinafter, a specific description will hereinafter be made on the configuration of the remote customer service system 10.

Next, a description will be made on the remote customer service system 10 in the present embodiment with reference to FIG. 1 and FIG. 2. FIG. 2 is a block diagram of the remote customer service system 10 in the present embodiment.

As illustrated in FIG. 2, the remote customer service system 10 includes the customer service terminal apparatus 100, the imaging apparatus 200, the control apparatus 300, and the operator terminal apparatus 400. The control apparatus 300 controls the customer service terminal apparatus 100, the imaging apparatus 200, and the operator terminal apparatus 400.

The customer service terminal apparatus 100 includes a controller 102, a storage 104, a display device 110, an operation acceptor 120, a voice input device 130, a voice output device 140, and a communicator 180. The controller 102 controls the storage 104, the display device 110, the operation acceptor 120, the voice input device 130, the voice output device 140, and the communicator 180.

The controller 102 includes a central processing unit (CPU).

The storage 104 includes a nonvolatile storage medium such as a hard disk. The storage 104 stores an IP address of the own terminal for the remote customer service and address information such as addresses of the imaging apparatus 200, the control apparatus 300, and the operator terminal apparatus 400. The storage 104 includes memory (read only memory (ROM) and random access memory (RAM)). In controller 102, the CPU executes a control program of a remote customer service application that is stored in the ROM.

The display device 110 shows the image. For example, the display device 110 shows images of the operator Op, the product in the store St, and/or the store St. The display device 110 enables the customer Cu to visually recognize the images of the operator Op, the product in the store St, and/or the store St.

The display device 110 includes a display panel such as a liquid-crystal panel and a drive circuit for driving the display panel (none of them is illustrated). Under control by the controller 102, the drive circuit supplies the display panel with drive signals for showing a video image of a subject captured by the imaging apparatus 200, a video image of a communication partner acquired via the communicator 180, and the like. The display panel shows the image that corresponds to the drive signal supplied from the drive circuit.

The operation acceptor 120 accepts an operation from the customer Cu. The operation acceptor 120 includes a mouse, a keyboard, a touch panel, or the like (none of them is illustrated). For example, the touch panel is provided in the display device 110. The operation acceptor 120 accepts the operation by the customer Cu and outputs an operation signal indicating the accepted operation to the controller 102.

The voice input device 130 accepts the voice in the store St. For example, the voice input device 130 accepts the voice of the customer Cu and converts the voice into an electric signal. An example of the voice input device 130 is a microphone.

The voice input device 130 collects the voice around the customer service terminal apparatus 100, converts the voice into the electric signal, and outputs the electric signal as a voice signal to the controller 102. In this way, the voice input device 130 can collect the voice around the customer service terminal apparatus 100.

The voice output device 140 outputs the voice to the inside of the store St. For example, the voice output device 140 converts the electric signal, which indicates voice information on the voice of the operator Op, into the voice and outputs the voice. An example of the voice output device 140 is a speaker.

The voice output device 140 subjects voice data output from the controller 102 to D/A conversion, amplifies the voice data, and outputs the voice.

The communicator 180 is a communication interface for communicating with the control apparatus 300 via the communication line. Under the control by the controller 102, the communicator 180 establishes the communication with the control apparatus 300 by using a communication protocol such as a real-time transport protocol (RTP). More specifically, the communicator 180 outputs data received from the control apparatus 300 to the controller 102, and transmits data input from the controller 102 to the control apparatus 300.

The communicator 180 exchanges the data with the operator terminal apparatus 400 via the control apparatus 300. The communicator 180 may exchange the data with the imaging apparatus 200 via the control apparatus 300.

In the controller 102, the CPU executes the control program of the remote customer service application, which is stored in the ROM, according to the operation by the customer Cu via the operation acceptor 120.

The imaging apparatus 200 includes a controller 202, a storage 204, an imaging device 210, and a communicator 280. The controller 202 controls the storage 204, the imaging device 210, and the communicator 280. The controller 202 includes a CPU.

The storage 204 includes a nonvolatile storage medium such as a hard disk. The storage 204 stores an IP address of the own terminal for the remote customer service and the address information such as the addresses of the customer service terminal apparatus 100, the control apparatus 300, and the operator terminal apparatus 400. The storage 204 includes memory (ROM and RAM). In the controller 202, the CPU executes the control program of the remote customer service application that is stored in the ROM.

The imaging device 210 includes a digital camera. The imaging device 210 outputs, to the controller 202, the captured image information acquired by imaging the subject within the range of an angle of view of the imaging device

6

210. That is, the imaging apparatus 200 images the subject such as the customer Cu. In addition, the imaging apparatus 200 has a normal mode and a tracking mode as imaging modes. The tracking mode is a mode in which a subject portion (a tracking target) instructed by the controller 202 is focused, and the tracking target is tracked and imaged until an instruction to terminate the tracking mode is received from the controller 202. In the tracking mode, an image that surrounds a predetermined area including the tracking target (hereinafter, a tracking image) is superimposed on the captured image. The normal mode is a mode in which the subject within the angle of view is automatically focused and imaged.

The communicator 280 is a communication interface for communicating with the control apparatus 300 via the communication line. Under the control by the controller 202, the communicator 280 establishes the communication with the control apparatus 300 by using the communication protocol such as the RTP. More specifically, the communicator 280 outputs the data received from the control apparatus 300 to the controller 202, and transmits the data input from the controller 202 to the control apparatus 300.

The communicator 280 exchanges the data with the imaging apparatus 200 via the control apparatus 300. The communicator 280 may exchange the data with the operator terminal apparatus 400 via the control apparatus 300.

In the controller 202, the CPU executes the control program of the remote customer service application that is stored in the ROM.

The control apparatus 300 includes a controller 302, a storage 304, and a communicator 380. The controller 302 controls the storage 304 and the communicator 380. The controller 302 includes a CPU.

The storage 304 includes a nonvolatile storage medium such as a hard disk. The storage 304 stores an IP address of the own terminal for the remote customer service and the address information such as the addresses of the customer service terminal apparatus 100, the imaging apparatus 200, and the operator terminal apparatus 400. The storage 304 includes memory (ROM and RAM). In the controller 302, the CPU executes the control program of the remote customer service application that is stored in the ROM.

In the controller 302, the CPU executes the control program of the remote customer service application that is stored in the ROM. When the CPU executes the control program, the controller 302 recognizes the subject included in the captured image by the imaging apparatus 200 as the tracking target, and acquires information on the tracking target from the captured image. In addition, when the CPU executes the control program, the controller 302 generates the control information for executing the notification that prompts the operator Op to start the customer service on the basis of the information on the tracking target. Furthermore, when the CPU executes the control program, the controller 302 determines whether the tracking target is requesting the customer service on the basis of the information on the tracking target.

Just as described, when the CPU executes the control program, the controller 302 functions as an image recognizer 302a, a control information generator 302b, and a determination device 302c, and executes remote customer service processing.

The image recognizer 302a recognizes the subject included in the captured image by the imaging apparatus 200 as the tracking target, and acquires the information on the tracking target from the captured image. The control information generator 302b generates the control information for executing the notification that prompts the operator Op to start the customer service on the basis of the information on the tracking target. The determination device 302c determines whether the tracking target is requesting the customer service on the basis of the information on the tracking target.

The communicator 380 is a communication interface for communicating with the imaging apparatus 200 via the communication line. Under the control by the controller 302, the communicator 380 establishes the communication with the imaging apparatus 200 by using the communication protocol such as the RTP. More specifically, the communicator 380 outputs the data received from the imaging apparatus 200 to the controller 302, and transmits the data input from the controller 302 to the imaging apparatus 200.

The communicator 380 exchanges the data with the customer service terminal apparatus 100.

The communicator 380 exchanges the data with the operator terminal apparatus 400. In the present specification, the communicator 380 may be described as a first communicator.

In the controller 302, the CPU executes the control program of the remote customer service application that is stored in the ROM.

The operator terminal apparatus 400 includes a controller 402, a storage 404, a display device 410, an operation acceptor 420, a voice input device 430, a voice output device 440, an imaging device 450, and a communicator 480. The controller 402 controls the storage 404, the display device 410, the operation acceptor 420, the voice input device 430, the voice output device 440, the imaging device 450, and the communicator 480.

The controller 402 includes a CPU.

The storage 404 includes a nonvolatile storage medium such as a hard disk. The storage 404 stores an IP address of the own terminal for the remote customer service and the address information such as the addresses of the customer service terminal apparatus 100, the imaging apparatus 200, and the control apparatus 300. The storage 404 includes memory (ROM and RAM). In the controller 402, the CPU executes the control program of the remote customer service application that is stored in the ROM.

The display device 410 shows the image of the store St. The display device 410 enables the operator Op to visually recognize the image of the customer Cu.

When receiving the control information, the display device 410 shows a message to prompt the operator Op to start the customer service. The display device 410 is an example of a notification device.

The display device 410 includes a display panel such as a liquid-crystal panel and a drive circuit for driving the display panel (none of them is illustrated). Under the control by the controller 402, the drive circuit supplies the display panel with drive signals for showing the video image of the subject captured by the imaging apparatus 200, the video image of the communication partner acquired via the communicator 480, and the like. The display panel shows the image that corresponds to the drive signal supplied from the drive circuit.

The operation acceptor 420 accepts an operation from the operator Op. The operation acceptor 420 includes a mouse, a keyboard, a touch panel, or the like (none of them is illustrated). The touch panel is provided in the display device 410. The operation acceptor 420 accepts the operation by the operator Op and outputs an operation signal indicating the operation by the operator Op to the controller 402. In the present specification, the operation acceptor 420 may be described to as a first operation acceptor. In addition, in the present specification, the operation acceptor 120 in the customer service terminal apparatus 100 may be described as a second operation acceptor.

The voice input device 430 accepts the voice in the call center Cc. For example, the voice input device 430 accepts the voice of the operator Op and converts the voice into an electric signal. An example of the voice input device 430 is a microphone.

The voice input device 430 collects the voice around the operator terminal apparatus 400, converts the voice into the electric signal, and outputs the electric signal as the voice signal to the controller 402. In this way, the voice input device 430 can collect the voice around the operator terminal apparatus 400.

The voice output device 440 outputs the voice to the inside of the call center Cc. For example, the voice output device 440 converts the electric signal, which indicates the voice information on the voice of the customer Cu, into the voice and outputs the voice. An example of the voice output device 440 is a speaker.

The voice output device 440 subjects voice data output from the controller 402 to the D/A conversion, amplifies the voice data, and outputs the voice.

When receiving the control information, the voice output device 440 outputs the voice to prompt the operator Op to start the customer service. The voice output device 440 is an example of the notification device.

The imaging device 450 includes a digital camera. The imaging device 450 outputs, to the controller 402, the captured image information acquired by imaging the subject within a range of an angle of view of the imaging device 450. Similar to the imaging device 210 in the imaging apparatus 200, the imaging device 450 may be trackable.

The communicator 480 is a communication interface for communicating with the control apparatus 300 via the communication line. Under the control by the controller 402, the communicator 480 establishes the communication with the control apparatus 300 by using the communication protocol such as the RTP. More specifically, the communicator 480 outputs the data received from the control apparatus 300 to the controller 402, and transmits the data input from the controller 402 to the control apparatus 300.

The communicator 480 exchanges the data with the customer service terminal apparatus 100 via the control apparatus 300. The communicator 480 may exchange the data with the imaging apparatus 200 via the control apparatus 300. In the present specification, the communicator 480 may be described as a second communicator. In addition, in the present specification, the communicator 180 in the customer service terminal apparatus 100 may be described as a third communicator.

In the controller 402, the CPU executes the control program of the remote customer service application, which is stored in the ROM, according to the operation by the operator Op via the operation acceptor 420.

Next, a description will be made on the remote customer service system 10 in the present embodiment with reference to FIG. 1 to FIG. 3E. FIG. 3A to FIG. 3E are schematic views of the remote customer service system 10 in the present embodiment.

As illustrated in FIG. 3A, the imaging apparatus 200 images the inside of the store St. The imaging apparatus 200 images the predetermined area in the store St. Typically, the imaging apparatus 200 images the vicinity of the customer service terminal apparatus 100 in the store St. The imaging apparatus 200 generates the captured image information of the inside of the store St. The imaging apparatus 200 transmits the captured image information on the captured image to the control apparatus 300.

The control apparatus 300 recognizes that there is no tracking target among the subjects in the captured image. For example, the image recognizer 302a recognizes that there is no tracking target among the subjects in the captured image.

As illustrated in FIG. 3B, when the customer Cu comes near the customer service terminal apparatus 100, the imaging apparatus 200 images the customer Cu in the store St. The imaging apparatus 200 transmits the captured image information on the captured images including the image of the customer Cu to the control apparatus 300.

The control apparatus 300 recognizes the subject included in the captured image as the tracking target. For example, the image recognizer 302a recognizes the subject (the customer Cu) in the captured image as the tracking target.

As illustrated in FIG. 3C, the control apparatus 300 determines whether the customer Cu is requesting the customer service. When the control apparatus 300 determines that the customer Cu is requesting the customer service, the control apparatus 300 transmits, to the operator terminal apparatus 400, the control information for executing the notification that prompts the operator Op to start the customer service.

For example, the determination device 302c determines whether a stay time of the tracking target at a predetermined place exceeds a first threshold. In the case where the stay time exceeds the first threshold, the control information generator 302b generates the control information and transmits the control information to the operator terminal apparatus 400.

Alternatively, the determination device 302c determines whether a frequency of visit by the tracking target to the predetermined place exceeds a second threshold. In the case where the frequency of visit exceeds the second threshold, the control information generator 302b generates the control information and transmits the control information to the operator terminal apparatus 400.

Figure 3D:
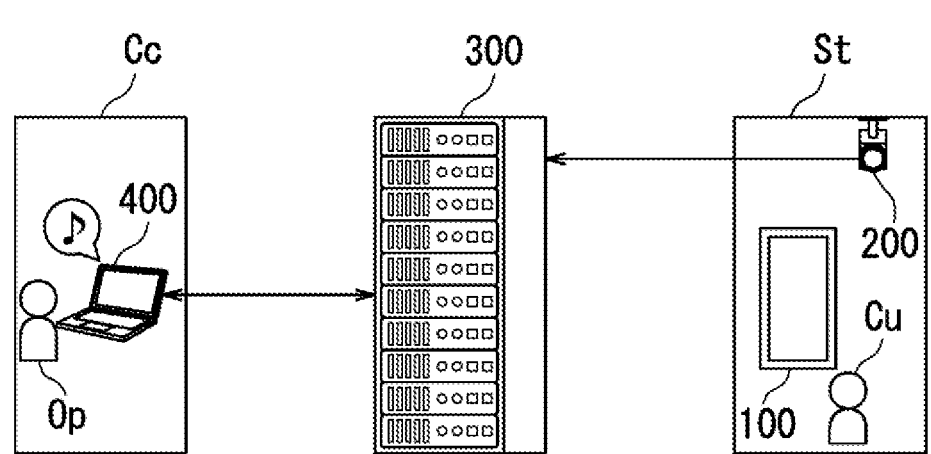
FIG. 3D is a schematic view of the remote customer service system in the present embodiment.

As illustrated in FIG. 3D, the operator terminal apparatus 400 executes the notification that prompts the start of the customer service on the basis of the control information. When the operator Op desires to start the customer service on the basis of the notification from the operator terminal apparatus 400, the operator terminal apparatus 400 transmits the customer service start information to the control apparatus 300.

Figure 3E:
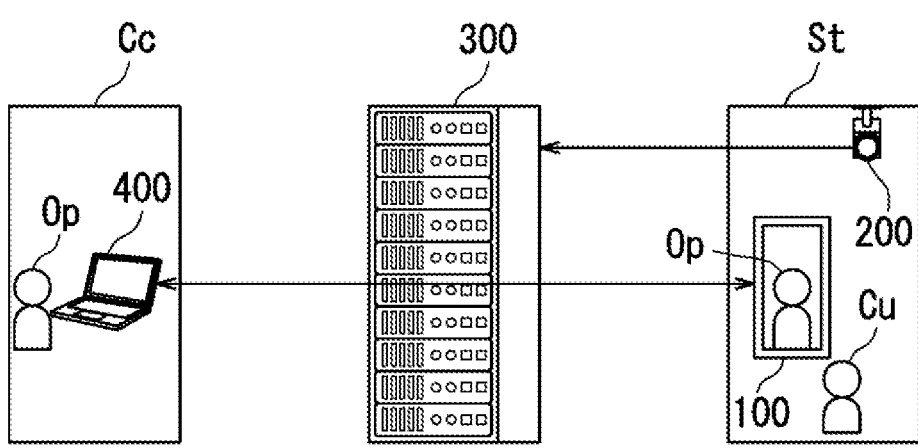
FIG. 3E is a schematic view of the remote customer service system in the present embodiment.

As illustrated in FIG. 3E, the operator terminal apparatus 400 communicates with the customer service terminal apparatus 100. For example, the operator terminal apparatus 400 communicates with the customer service terminal apparatus 100 via the control apparatus 300. Alternatively, the operator terminal apparatus 400 may communicate with the customer service terminal apparatus 100 without the control apparatus 300 being interposed therebetween. By using the operator terminal apparatus 400, the operator Op can serve the customer Cu in front of the customer service terminal apparatus 100.

As it has been described so far, according to the present embodiment, the operator Op can start serving the customer Cu when the customer Cu needs the service.

Figure 4:
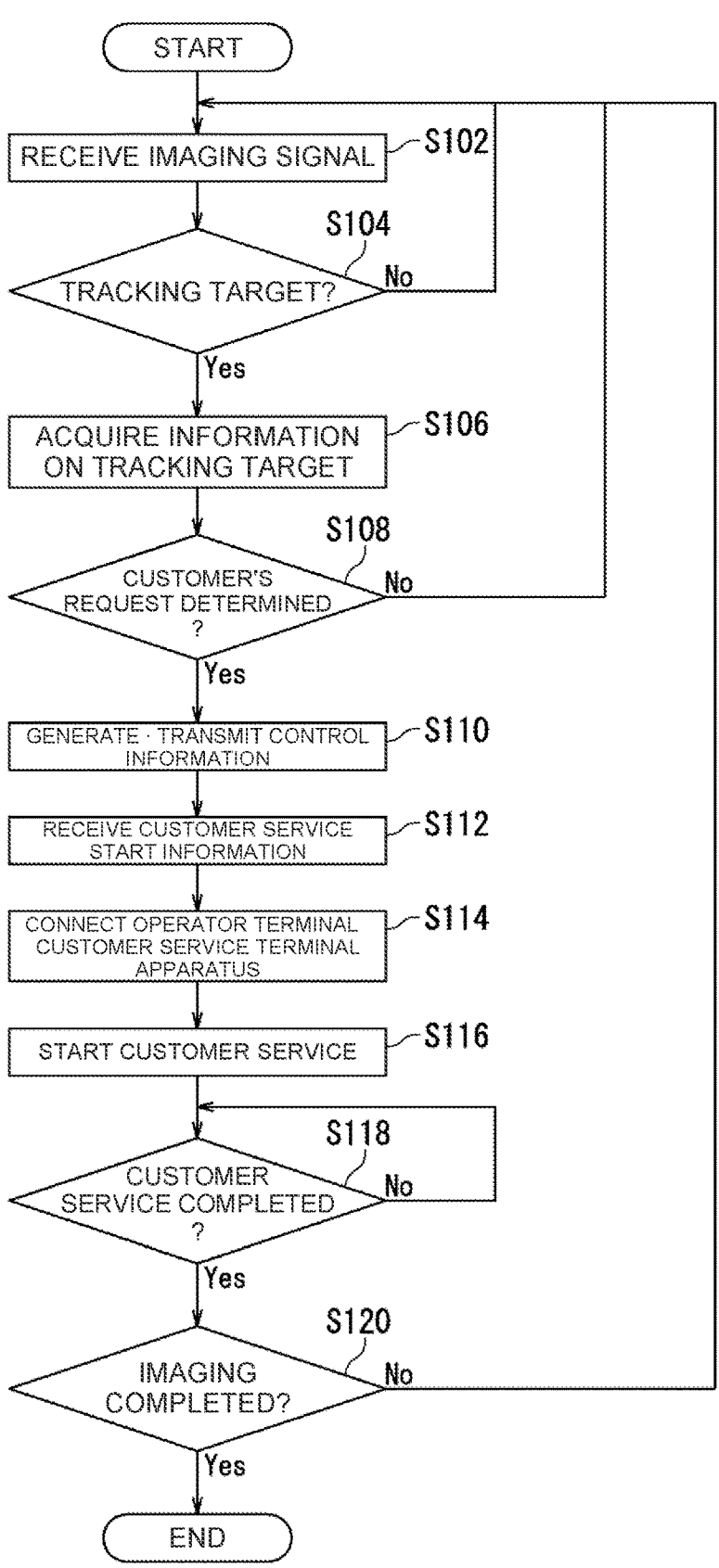
FIG. 4 is a flowchart of a control apparatus in the remote customer service system in the present embodiment.

Next, a description will be made on the remote customer service system 10 in the present embodiment with reference to FIG. 1 to FIG. 4. FIG. 4 is a flowchart of the control apparatus 300 in the remote customer service system 10 in the present embodiment.

As illustrated in FIG. 4, in Step S102, the control apparatus 300 receives the captured image information from the imaging apparatus 200. The imaging apparatus 200 generates the captured image information on the captured image, and the control apparatus 300 receives the captured image information from the imaging apparatus 200.

In step S104, it is determined whether the subjects that are included in the captured image indicated by the captured image information include the tracking target. For example, the controller 302 determines whether a person is included as the tracking target in the captured image. Alternatively, the controller 302 determines whether a specific person is included as the tracking target in the captured image.

If the tracking target is included in the captured image (Yes in step S104), the processing proceeds to step S106. On the other hand, if the tracking target is not included in the captured image (No in step S104), the processing returns to step S102. In this case, the controller 302 repeats the processing in step S102 and step S104 until it is determined that the subject (the customer Cu) is included as the tracking target in the captured image.

In step S106, the information on the tracking target is acquired.

In step S108, it is determined whether the tracking target is requesting the customer service. For example, the controller 302 determines whether the tracking target is requesting the customer service. In one example, the determination device 302c determines whether the tracking target is requesting the customer service on the basis of the information on the tracking target.

If it is determined that the tracking target is requesting the customer service (Yes in step S108), the processing proceeds to step S110. On the other hand, if it is determined that the tracking target is not requesting the customer service (No in step S108), the processing returns to step S102. In this case, the controller 302 repeats the processing in step S102 to step S108 until it is determined that the tracking target is requesting the customer service.

In step S110, the control apparatus 300 generates the control information for executing the notification that prompts the operator Op to start the customer service. Then, the control apparatus 300 transmits the control information to the operator terminal apparatus 400. For example, the controller 302 generates the control information and transmits the control information to the operator terminal apparatus 400.

In this case, the operator terminal apparatus 400 executes the notification that prompts the operator Op to start the customer service. For example, in the operator terminal apparatus 400, the display device 410 shows the message that prompts the start of the customer service. Alternatively, in the operator terminal apparatus 400, the voice output device 440 outputs the voice that prompts the start of the customer service.

In step S112, the control apparatus 300 receives the customer service start information, which indicates the start of the customer service, from the operator terminal apparatus 400. The operator terminal apparatus 400 generates the customer service start information, and the control apparatus 300 receives the customer service start information from the operator terminal apparatus 400.

Typically, in the operator terminal apparatus 400, when the operation acceptor 420 accepts an operation by the operator Op to permit the start of the customer service, the communicator 480 transmits the customer service start information to the control apparatus 300.

In step S114, the control apparatus 300 connects the operator terminal apparatus 400 and the customer service terminal apparatus 100. The controller 302 connects the operator terminal apparatus 400 and the customer service terminal apparatus 100 so as to enable the operator Op on the operator terminal apparatus 400 to serve the customer Cu on the customer service terminal apparatus 100.

In step S116, the control apparatus 300 starts the service for the customer Cu by the operator Op. The controller 302 keeps the connection between the operator terminal apparatus 400 and the customer service terminal apparatus 100.

In step S118, it is determined whether the customer service is completed. For example, the controller 302 determines whether the tracking target in the captured image is within the angle of view.

If it is determined in step S118 that the customer service is completed (Yes in step S118), the processing proceeds to step S120. On the other hand, if it is determined in step S118 that the customer service is not completed in step S118 (No in step S118), the processing returns to step S118. In this case, the controller 302 repeats the processing in step S118 until it is determined that the customer service is completed.

In step S120, it is determined whether reception of photographing information is completed. For example, the controller 302 determines whether the reception of the photographing information is completed. Typically, when the imaging apparatus 200 is turned off, the controller 302 determines that the reception of the photographing information is completed.

If it is determined in step S120 that the reception of the photographing information is completed (Yes in step S120), the processing is terminated. On the other hand, if it is determined in step S120 that the reception of the photographing information is not completed (No in step S120), the processing returns to step S102. In this case, the controller 302 repeats the processing in step S102 to step S120 until it is determined that the reception of the photographing information is completed.

According to the present embodiment, as it has been described so far, the customer service can be started for the customer Cu when the customer Cu needs the service.

Next, a description will be made on the remote customer service system 10 in the present embodiment with reference to FIG. 1 to FIG. 5F. FIG. 5A to FIG. 5F are schematic views of the remote customer service system 10 in the present embodiment.

As illustrated in FIG. 5A, the imaging apparatus 200 images the inside of the store St. The imaging apparatus 200 images the vicinity of the customer service terminal apparatus 100 in the store St. Typically, the imaging apparatus 200 images the predetermined area in the store St. The imaging apparatus 200 generates the captured image information acquired by imaging the vicinity of the customer service terminal apparatus 100. The imaging apparatus 200 transmits the captured image information to the control apparatus 300.

The control apparatus 300 determines whether the tracking target is present as the subject in the captured image information.

As illustrated in FIG. 5B, when the customer Cu comes near the customer service terminal apparatus 100, the imaging apparatus 200 images the customer Cu in the store St. The imaging apparatus 200 transmits the captured image information on the captured images including the image of the customer Cu to the control apparatus 300. The control apparatus 300 recognizes the customer Cu as the tracking target.

As illustrated in FIG. 5C, the control apparatus 300 determines whether the customer Cu is requesting the customer service. When the control apparatus 300 determines that the customer Cu as the tracking target is requesting the customer service, the control apparatus 300 transmits, to the operator terminal apparatus 400, the control information for executing the notification that prompts the operator Op to start the customer service.

For example, in the case where the customer Cu is present in the captured image indicated by the captured image information for a predetermined period, the control apparatus 300 determines that the customer Cu is requesting the customer service. In one example, in the case where the customer Cu is present in the captured image indicated by the captured image information for the predetermined period that is 10 seconds or longer and 10 minutes or shorter, the control apparatus 300 determines that the customer Cu is requesting the customer service.

Alternatively, in the case where the customer Cu appears a plurality of times in the captured image indicated by the captured image information, the control apparatus 300 determines that the customer Cu is requesting the customer service. In one example, in the case where the customer Cu appears three times in one hour in the captured image indicated by the captured image information, the control apparatus 300 determines that the customer Cu is requesting the customer service.

When the control apparatus 300 determines that the customer Cu as the tracking target is requesting the customer service, the control apparatus 300 transmits, to the operator terminal apparatus 400, the control information for executing the notification that prompts the operator Op to start the customer service.

Figure 5D:
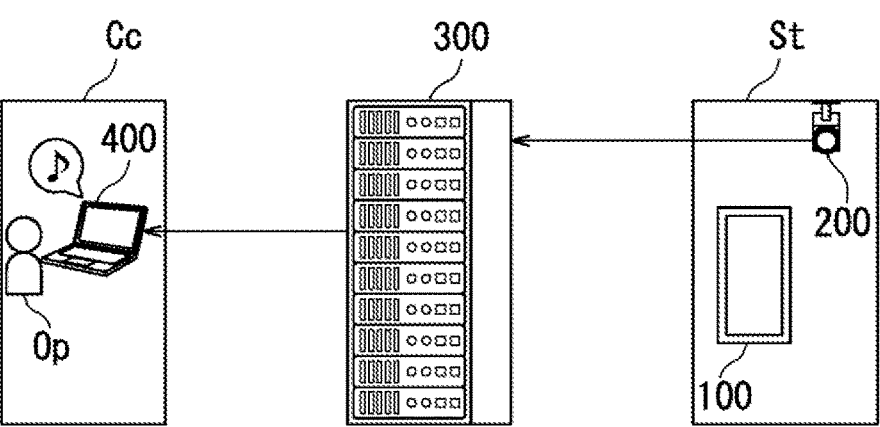
FIG. 5D is a schematic view of the remote customer service system in the present embodiment.
Figure 5E:
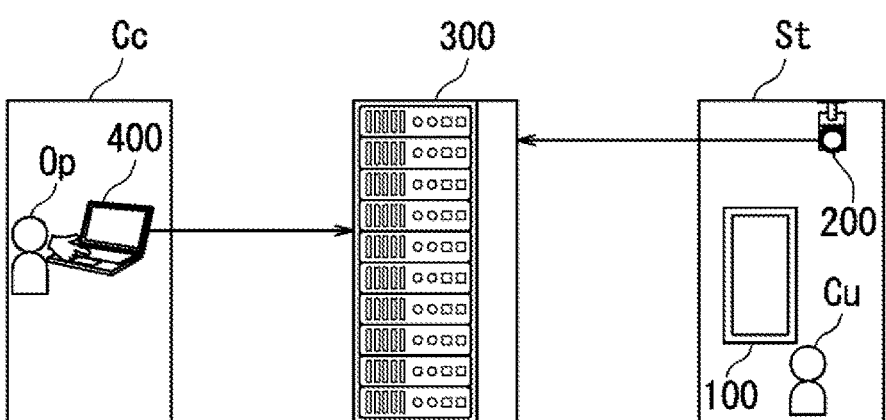
FIG. 5E is a schematic view of the remote customer service system in the present embodiment.

As illustrated in FIG. 5D, the operator terminal apparatus 400 executes the notification that prompts the start of the customer service on the basis of the control information. For example, the operator terminal apparatus 400 notifies the operator Op of the presence of the customer Cu, for whom the customer service should be started. In one example, in the operator terminal apparatus 400, the voice output device 440 outputs, to the operator Op, the voice indicating the presence of the customer Cu, for whom the customer service should be started.

Figure 5F:
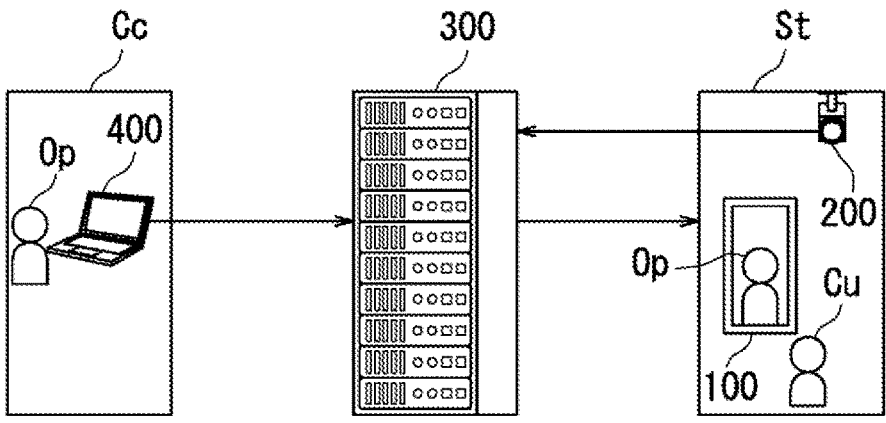
FIG. 5F is a schematic view of the remote customer service system in the present embodiment.

As illustrated in FIG. 5F, when the operator Op desires to start the customer service from the operator terminal apparatus 400, the control apparatus 300 receives the customer service start information from the operator terminal apparatus 400. For example, when the operator Op operates the operation acceptor 420 in the operator terminal apparatus 400 and desires to start the customer service, the operator terminal apparatus 400 transmits the customer service start information to the control apparatus 300.

As illustrated in FIG. 5F, the control apparatus 300 connects the operator terminal apparatus 400 and the customer service terminal apparatus 100 on the basis of the customer service start information. For example, the operator terminal apparatus 400 communicates with the customer service terminal apparatus 100 via the control apparatus 300. By using the operator terminal apparatus 400, the operator Op can serve the customer Cu in front of the customer service terminal apparatus 100.

As it has been described so far, according to the present embodiment, the operator Op can start serving the customer Cu when the customer Cu needs the service.

Figure 6:
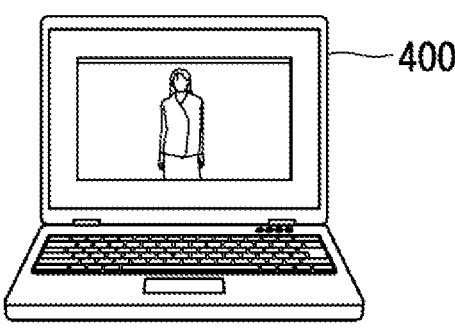
FIG. 6 is a schematic view illustrating an example of an operator terminal apparatus in the remote customer service system in the present embodiment.

Next, a description will be made on the remote customer service system 10 in the present embodiment with reference to FIG. 1 to FIG. 6. FIG. 6 is a schematic view illustrating an example of the operator terminal apparatus 400 in the remote customer service system 10 in the present embodiment.

As illustrated in FIG. 6, the operator terminal apparatus 400 may show the captured image information that is captured by the imaging apparatus 200. For example, in the case where the imaging apparatus 200 images the customer Cu, the operator terminal apparatus 400 may show the customer Cu imaged by the imaging apparatus 200.

The operator terminal apparatus 400 may show the customer Cu after receiving the control information. In this case, due to the reception of the control information by the operator terminal apparatus 400, the operator Op can visually recognize the customer Cu.

Alternatively, the operator terminal apparatus 400 may show the customer Cu before receiving the control information for executing the notification that prompts the operator Op to start the customer service. In this case, when the operator terminal apparatus 400 receives the control information while showing the customer Cu, the operator terminal apparatus 400 notifies the operator Op to start serving the customer Cu.

Figure 7:
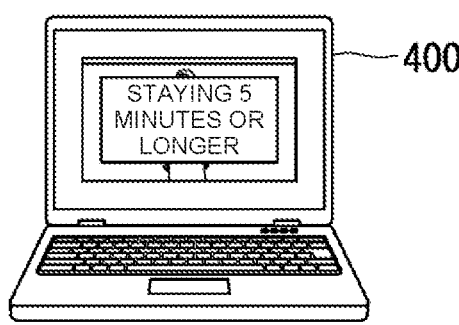
FIG. 7 is a schematic view illustrating an example of the operator terminal apparatus in the remote customer service system in the present embodiment.

For example, as illustrated in FIG. 7, when the operator terminal apparatus 400 receives the control information while showing the customer Cu, the operator terminal apparatus 400 may show a message indicating that the customer Cu stays for a predetermined time or longer.

Figure 8:
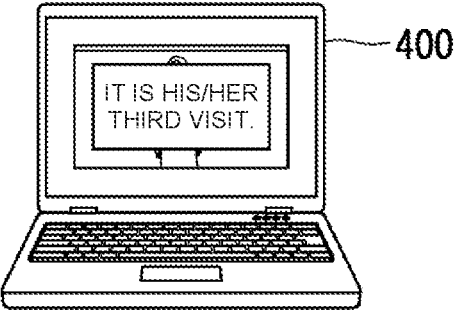
FIG. 8 is a schematic view illustrating an example of the operator terminal apparatus in the remote customer service system in the present embodiment.

Alternatively, as illustrated in FIG. 8, when receiving the control information indicating that the captured image including the customer Cu has been received a plurality of times, the operator terminal apparatus 400 may show a message indicating that the customer Cu has been tracked a predetermined number of times.

In the above description, the customer service terminal apparatus 100 shows the operator Op who uses the operator terminal apparatus 400, and the operator Op on the operator terminal apparatus 400 starts serving the customer Cu in front of the customer service terminal apparatus 100. However, the present embodiment is not limited thereto. The operator Op on the operator terminal apparatus 400 may start the customer service on the basis of action of the customer Cu in front of the customer service terminal apparatus 100. For example, when the operator terminal apparatus 400 transmits the customer service start information, the customer service terminal apparatus 100 may accept the action of the customer Cu to request the customer service.

Figure 9:
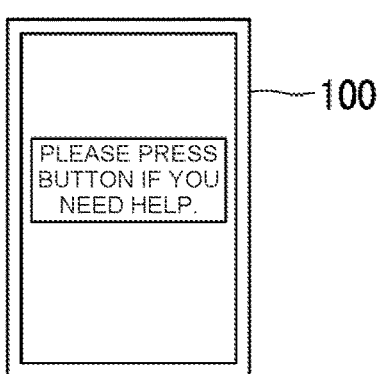
FIG. 9 is a schematic view illustrating an example of the operator terminal apparatus in the remote customer service system in the present embodiment.

For example, as illustrated in FIG. 9, when the operator terminal apparatus 400 transmits the customer service start information, the customer service terminal apparatus 100 shows a message for confirming whether the customer Cu desires the customer service by the operator Op. When the customer Cu operates the operation acceptor 120 in the customer service terminal apparatus 100, the operator Op can start serving the customer Cu in front of the customer service terminal apparatus 100.

In the above description, in order to avoid excessive complexity of the disclosure, the control apparatus 300 connects the single customer service terminal apparatus 100, the single imaging apparatus 200, and the single operator terminal apparatus 400. However, the present embodiment is not limited thereto. The control apparatus 300 may connect a plurality of the customer service terminal apparatuses 100, a plurality of the imaging apparatuses 200, and a plurality of the operator terminal apparatuses 400.

Figure 10:
FIG. 10 is a schematic view of the remote customer service system in the present embodiment.

Next, a description will be made on the remote customer service system 10 in the present embodiment with reference to FIG. 1 to FIG. 10. FIG. 10 is a schematic view illustrating an example of the operator terminal apparatus 400 in the remote customer service system 10 in the present embodiment.

As illustrated in FIG. 10, the remote customer service system 10 includes the plurality of the customer service terminal apparatuses 100, the plurality of the imaging apparatuses 200, the control apparatus 300, and the plurality of the operator terminal apparatuses 400. Here, the customer service terminal apparatuses 100 include a customer service terminal apparatus 100A, a customer service terminal apparatus 100B, and a customer service terminal apparatus 100C, and the imaging apparatuses 200 include an imaging apparatus 200A, an imaging apparatus 200B, and an imaging apparatus 200C. In addition, the operator terminal apparatuses 400 include an operator terminal apparatus 400A, an operator terminal apparatus 400B, and an operator terminal apparatus 400C. The imaging apparatus 200A images the subject such as the customer Cu at a certain place, and the imaging apparatus 200B images the subject such as the customer Cu at another place.

For example, the operator terminal apparatus 400A, the operator terminal apparatus 400B, and the operator terminal apparatus 400C may be operated by the single operator Op.

In the case where the imaging apparatus 200A images the customer Cu near the customer service terminal apparatus 100A, the control apparatus 300 transmits the control information to the operator terminal apparatus 400A. In addition, in the case where the imaging apparatus 200B images the customer Cu near the customer service terminal apparatus 100B, the control apparatus 300 transmits the control information to the operator terminal apparatus 400B. Similarly, in the case where the imaging apparatus 200C images the customer Cu near the customer service terminal apparatus 100C, the control apparatus 300 transmits the control information to the operator terminal apparatus 400C. Since the control apparatus 300 transmits the control information to the operator terminal apparatus 400 according to the imaging apparatus 200, just as described, the operator Op can comprehend at which place in the store St the customer Cu is requesting the customer service.

Figure 11A:
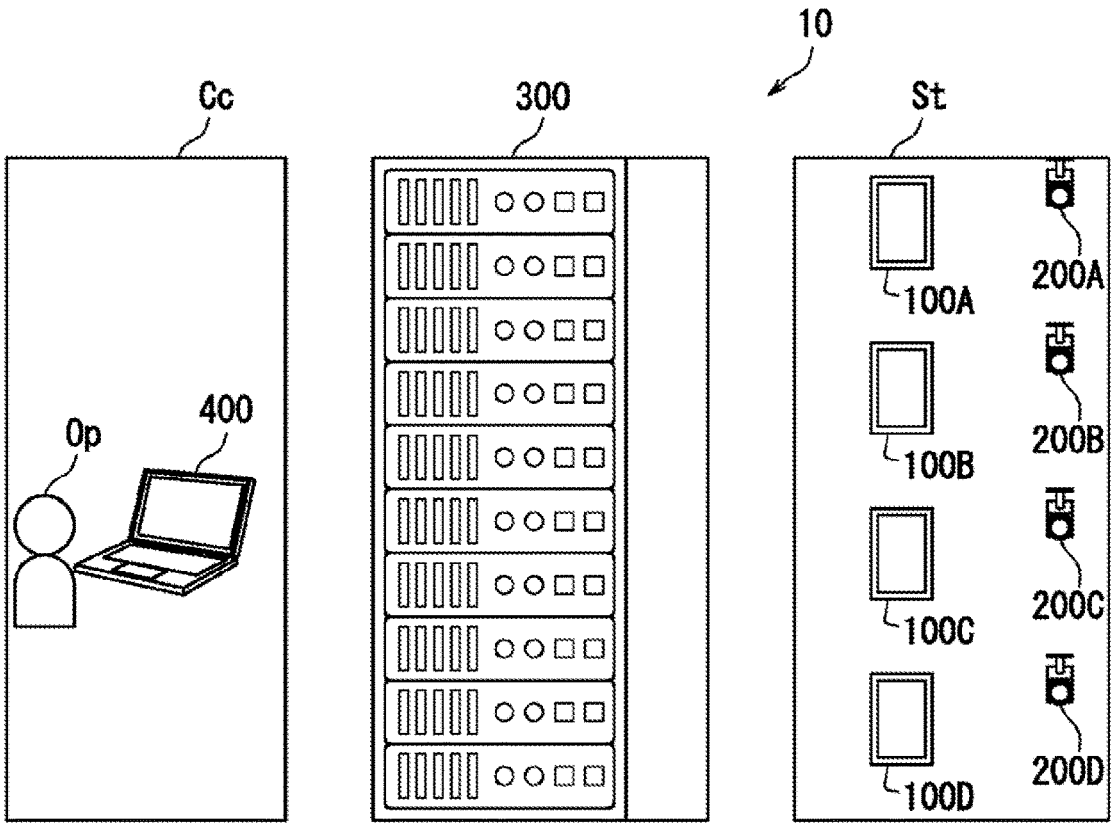
FIG. 11A is a schematic view of the remote customer service system in the present embodiment.
Figure 11B:
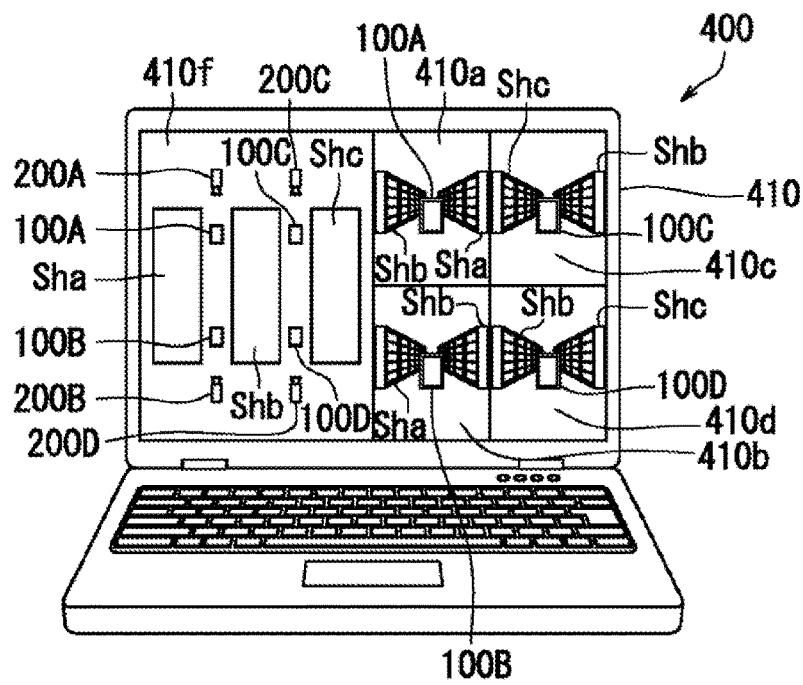
FIG. 11B is a schematic view illustrating an example of the operator terminal apparatus in the remote customer service system in the present embodiment.

Next, a description will be made on the remote customer service system 10 in the present embodiment with reference to FIG. 1 to FIG. 11B. FIG. 11A is a schematic view of the remote customer service system 10 in the present embodiment. FIG. 11B is a schematic view illustrating an example of the operator terminal apparatus 400 in the remote customer service system 10 in the present embodiment.

As illustrated in FIG. 11A, the remote customer service system 10 includes the customer service terminal apparatuses 100A to 100D, the imaging apparatuses 200A to 200D, the control apparatus 300, and the operator terminal apparatus 400. The control apparatus 300 controls the customer service terminal apparatuses 100A to 100D, the imaging apparatuses 200A to 200D, and the operator terminal apparatus 400.

The imaging apparatus 200A images the vicinity of the customer service terminal apparatus 100A. Similarly, the imaging apparatuses 200B to 200D image the vicinities of the customer service terminal apparatuses 100B to 100D, respectively.

As illustrated in FIG. 11B, in the operator terminal apparatus 400, the display device 410 shows the predetermined areas in the store St. The display device 410 shows the image captured by the imaging apparatus 200A in an area 410a. Similarly, the display device 410 shows the images captured by the imaging apparatuses 200B to 200D in areas 410b to 410d, respectively.

In addition, in an area 410f, the display device 410 shows a floor map that indicates arrangement positions of the customer service terminal apparatuses 100A to 100D and the imaging apparatuses 200A to 200D in the store St.

The customer service terminal apparatus 100A and the customer service terminal apparatus 100B are located between a shelf Sha and a shelf Shb in the store St, and the customer service terminal apparatus 100C and the customer service terminal apparatus 100D are located between the shelf Shb and a shelf Shc in the store St.

In the above description with reference to FIG. 1 to FIG. 11B, the imaging apparatus 200 is arranged away from the customer service terminal apparatus 100. However, the present embodiment is not limited thereto. The imaging apparatus 200 may be arranged adjacent to the customer service terminal apparatus 100. Alternatively, the imaging apparatus 200 may be incorporated in the customer service terminal apparatus 100.

Next, a description will be made on the remote customer service system 10 in the present embodiment with reference to FIG. 1 to FIG. 12. FIG. 12 is a block diagram of the remote customer service system 10 in the present embodiment. The remote customer service system 10 in FIG. 12 has the same configuration as that of the remote customer service system 10 illustrated in FIG. 2 except that the imaging apparatus 200 is incorporated in the customer service terminal apparatus 100, and an overlapping description will not be made for a purpose of avoiding redundancy.

As illustrated in FIG. 12, the remote customer service system 10 includes the customer service terminal apparatus 100, the imaging apparatus 200, the control apparatus 300, and the operator terminal apparatus 400. The customer service terminal apparatus 100 is arranged in the store St. The customer service terminal apparatus 100 is used to serve the customer Cu.

The imaging apparatus 200 images the inside of the store St. The imaging apparatus 200 is arranged in the store St.

The customer service terminal apparatus 100 includes the controller 102, the storage 104, the display device 110, the operation acceptor 120, the voice input device 130, the voice output device 140, and the communicator 180. Here, the imaging apparatus 200 is incorporated in the customer service terminal apparatus 100. The controller 102 controls the imaging apparatus 200 in addition to the storage 104, the display device 110, the operation acceptor 120, the voice input device 130, the voice output device 140, and the communicator 180.

The communicator 180 is the communication interface for communicating with the control apparatus 300 via the communication line. Under the control by the controller 102, the communicator 180 establishes the communication with the control apparatus 300 by using the communication protocol such as the RTP. More specifically, the communicator 180 transmits the captured image information received from the imaging apparatus 200 to the control apparatus 300.

In the above description with reference to FIG. 12, the imaging apparatus 200 is incorporated in the customer service terminal apparatus 100. However, the present embodiment is not limited thereto. The control apparatus 300 may be incorporated in the customer service terminal apparatus 100.

Figure 13:
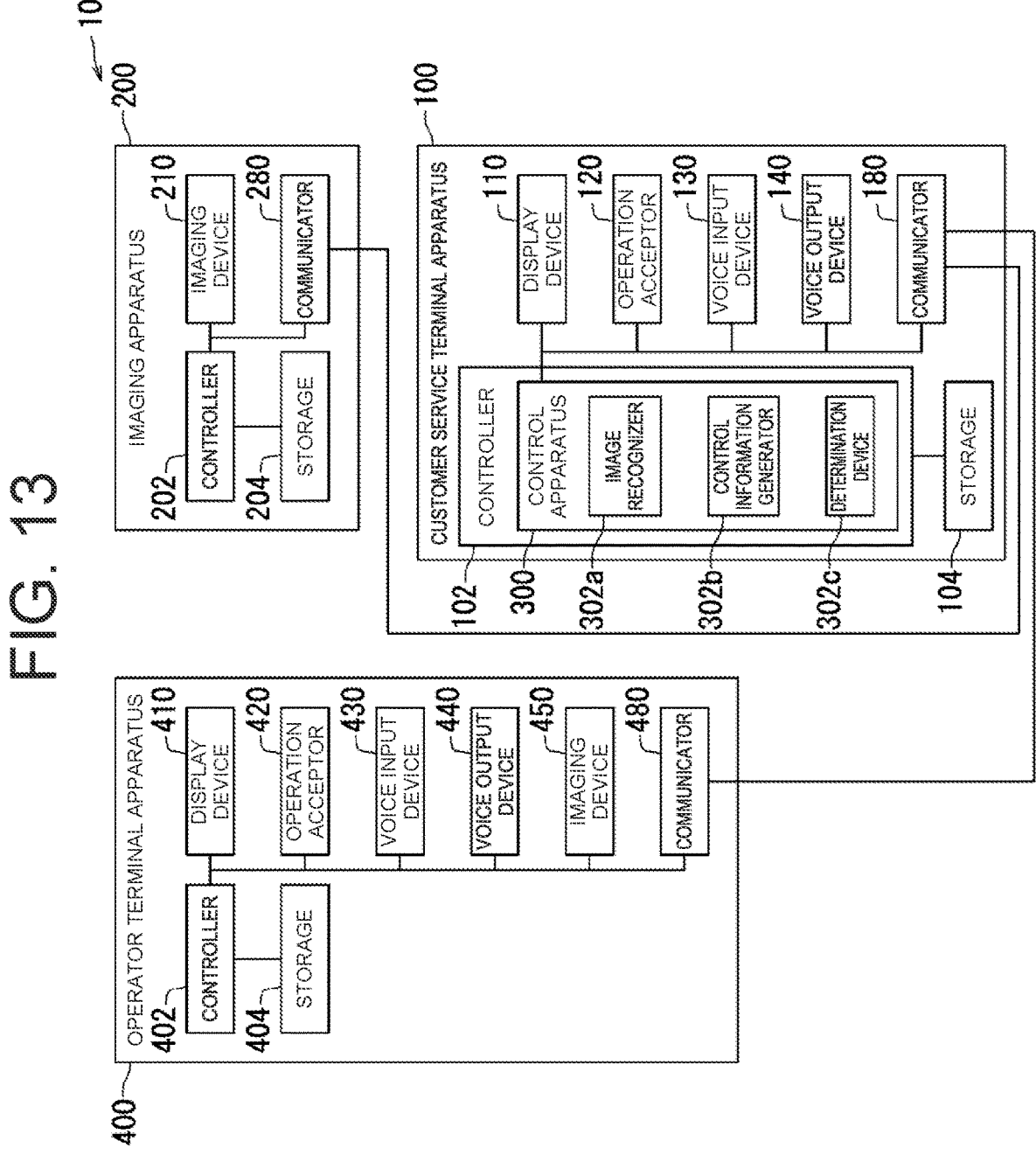
FIG. 13 is a block diagram of the remote customer service system in the present embodiment.

Next, a description will be made on the remote customer service system 10 in the present embodiment with reference to FIG. 1 to FIG. 13. FIG. 13 is a block diagram of the remote customer service system 10 in the present embodiment. The remote customer service system 10 in FIG. 13 has the same configuration as that of the remote customer service system 10 illustrated in FIG. 2 except that the control apparatus 300 is incorporated in the customer service terminal apparatus 100, and an overlapping description will not be made for a purpose of avoiding the redundancy.

As illustrated in FIG. 13, the remote customer service system 10 includes the customer service terminal apparatus 100, the imaging apparatus 200, the control apparatus 300, and the operator terminal apparatus 400. The customer service terminal apparatus 100 is arranged in the store St. The customer service terminal apparatus 100 is used to serve the customer Cu.

The imaging apparatus 200 images the inside of the store St. The imaging apparatus 200 is arranged in the store St.

The customer service terminal apparatus 100 includes the controller 102, the storage 104, the display device 110, the operation acceptor 120, the voice input device 130, the voice output device 140, and the communicator 180. Here, the control apparatus 300 is incorporated in the controller 102. In the control apparatus 300, the CPU executes the control program of the remote customer service application that is stored in the ROM. When the CPU executes the control program, the control apparatus 300 recognizes the subject included in the captured image by the imaging apparatus 200 as the tracking target, and acquires the information on the tracking target from the captured image. In addition, when the CPU executes the control program, the control apparatus 300 generates the control information for executing the notification that prompts the operator Op to start the customer service on the basis of the information on the tracking target. Furthermore, when the CPU executes the control program, the control apparatus 300 determines whether the tracking target is requesting the customer service on the basis of the information on the tracking target.

Just as described, when the CPU executes the control program, the control apparatus 300 functions as the image recognizer 302a, the control information generator 302b, and the determination device 302c, and executes the remote customer service processing.

The image recognizer 302a recognizes the subject included in the captured image by the imaging apparatus 200 as the tracking target, and acquires the information on the tracking target from the captured image. The control information generator 302b generates the control information for executing the notification that prompts the operator Op to start the customer service on the basis of the information on the tracking target. The determination device 302c determines whether the tracking target is requesting the customer service on the basis of the information on the tracking target.

In the above description with reference to FIG. 13, the control apparatus 300 is incorporated in the customer service terminal apparatus 100. However, the present embodiment is not limited thereto. The control apparatus 300 may be incorporated in the operator terminal apparatus 400.

Next, a description will be made on the remote customer service system 10 in the present embodiment with reference to FIG. 1 to FIG. 14. FIG. 14 is a block diagram of the remote customer service system 10 in the present embodiment. The remote customer service system 10 in FIG. 14 has the same configuration as that of the remote customer service system 10 illustrated in FIG. 2 except that the control apparatus 300 is incorporated in the operator terminal apparatus 400, and an overlapping description will not be made for a purpose of avoiding the redundancy.

As illustrated in FIG. 14, the remote customer service system 10 includes the customer service terminal apparatus 100, the imaging apparatus 200, the control apparatus 300, and the operator terminal apparatus 400. The customer service terminal apparatus 100 is arranged in the store St. The customer service terminal apparatus 100 is used to serve the customer Cu.

The imaging apparatus 200 images the inside of the store St. The imaging apparatus 200 is arranged in the store St.

The operator terminal apparatus 400 includes the controller 402, the storage 404, the display device 410, the operation acceptor 420, the voice input device 430, the voice output device 440, and the communicator 480. Here, the control apparatus 300 is incorporated in the controller 402. In the control apparatus 300, the CPU executes the control program of the remote customer service application that is stored in the ROM. When the CPU executes the control program, the control apparatus 300 recognizes the subject included in the captured image by the imaging apparatus 200 as the tracking target, and acquires the information on the tracking target from the captured image. In addition, when the CPU executes the control program, the control apparatus 300 generates the control information for executing the notification that prompts the operator Op to start the customer service on the basis of the information on the tracking target. Furthermore, when the CPU executes the control program, the control apparatus 300 determines whether the tracking target is requesting the customer service on the basis of the information on the tracking target.

Just as described, when the CPU executes the control program, the control apparatus 300 functions as the image recognizer 302*a*, the control information generator 302*b*, and the determination device 302*c*, and executes the remote customer service processing.

The image recognizer 302*a* recognizes the subject included in the captured image by the imaging apparatus 200 as the tracking target, and acquires the information on the tracking target from the captured image. The control information generator 302*b* generates the control information for executing the notification that prompts the operator Op to start the customer service on the basis of the information on the tracking target. The determination device 302*c* determines whether the tracking target is requesting the customer service on the basis of the information on the tracking target.

The description has been made so far on the embodiment according to the present disclosure. However, the present disclosure is not limited to the embodiment described above, and can be implemented in various aspects without departing from the gist thereof. For ease of understanding, the drawings are schematically illustrated mainly on the individual constituent elements, and thicknesses, lengths, numbers, and the like of the constituent elements illustrated in the drawings may differ from actual values for convenience of production of the drawings. Shapes, dimensions, and the like of the constituent elements in the embodiment described above are merely examples, and the present disclosure is not particularly limited thereto. It is needless to say that various modifications can be made thereto without substantially departing from the effects of the present disclosure.

The invention claimed is:

1. A remote customer service system in which an operator, who is at a remote place away from a customer visiting a store, serves the customer via each of a plurality of customer service terminal apparatuses provided at the store using each of a plurality of operator terminal apparatuses provided at the remote place, the remote customer service system comprising:

the plurality of customer service terminal apparatuses;

the plurality of operator terminal apparatuses;

an imaging apparatus that captures images from inside of the store; and a control apparatus, wherein:

the plurality of customer service terminal apparatuses comprises a first customer service terminal apparatus, a second customer service terminal apparatus, and a third customer service terminal apparatus, the plurality of operator terminal apparatuses comprises a first operator terminal apparatus, a second operator terminal apparatus, and a third operator terminal apparatus, the first customer service terminal apparatus is associated only with the first operator terminal apparatus, the second customer service terminal apparatus is associated only with the second operator terminal apparatus, and the third customer service terminal apparatus is associated only with the third operator terminal apparatus, and the control apparatus:

recognizes a subject included in an image, captured by the imaging apparatus, as a tracking target, and acquires information of the tracking target when the captured image indicates that the tracking target is near one of the plurality of customer service terminal apparatuses, and generates, when at least one criteria is met, control information to provide a notification on a corresponding one of the plurality of operator terminal apparatuses that is associated only with the one customer service terminal apparatus near which the tracking target is to prompt the operator to provide customer service based on the acquired information of the tracking target.

2. The remote customer service system according to claim 1, wherein the control apparatus determines whether the tracking target is requesting the customer service based on the information of the tracking target, and the at least one criteria is met when the control apparatus determines that the tracking target is requesting the customer service.

3. The remote customer service system according to claim 1, wherein the control apparatus determines whether a stay time of the tracking target at a predetermined place near the one customer service terminal apparatus exceeds a first threshold, and the at least one criteria is met when the stay time exceeds the first threshold.

4. The remote customer service system according to claim 3, wherein the control apparatus further determines whether a frequency of visiting, by the tracking target, the predetermined place exceeds a second threshold, and the at least one criteria is met when the frequency of visit exceeds the second threshold.

5. The remote customer service system according to claim 1, wherein each of the plurality of operator terminal apparatuses accepts an operation, from the operator, to provide the customer service via each of the plurality of customer service terminal apparatuses, and the control apparatus communicates with each of the plurality of operator terminal apparatuses, and transmits the control information to each of the plurality of operator terminal apparatuses.

6. The remote customer service system according to claim 5, wherein each of the plurality of operator terminal apparatuses:

communicates with the control apparatus to receive the control information, and executes the notification prompting the operator to start the customer service when receiving the control information.

7. The remote customer service system according to claim 1, wherein in the case that the corresponding one of the plurality of operator terminal apparatuses accepts an operation from the operator, the corresponding one of the plurality of operator terminal apparatuses communicates with the one of the plurality of customer service terminal apparatus at a place where the tracking target is present.

8. The remote customer service system according to claim 1, wherein in the case that the one of the plurality of customer service terminal apparatuses accepts an operation from the customer, the one of the plurality of customer service terminal apparatuses communicates with the corresponding one of the plurality of operator terminal apparatuses.

* * * * *